United States Patent

Hausner

[15] 3,676,751

[45] July 11, 1972

[54] SELECTION CIRCUITRY

[72] Inventor: Jerry Hausner, Flushing, N.Y.

[73] Assignee: The Narda Microwave Corporation, Plainview, N.Y.

[22] Filed: Jan. 4, 1971

[21] Appl. No.: 103,778

[52] U.S. Cl. ....................317/137, 317/154
[51] Int. Cl. ....................H01h 47/04
[58] Field of Search ....................317/136, 137, 154

[56] References Cited

UNITED STATES PATENTS 3,311,795 3/1967 Gilbert....................317/136 X

*Primary Examiner*—J. D. Miller
*Assistant Examiner*—Harry E. Moose, Jr.
*Attorney*—Robert R. Strack and James A. Eisenman

[57] ABSTRACT

A broad band high frequency sweep generator is disclosed wherein the operating modes and critical frequencies are selected by pushbutton actuated switches. The switches are interconnected in order to insure that each mode discretely controls operation of the generator and the critical frequencies required for any particular mode only are selected.

3 Claims, 12 Drawing Figures

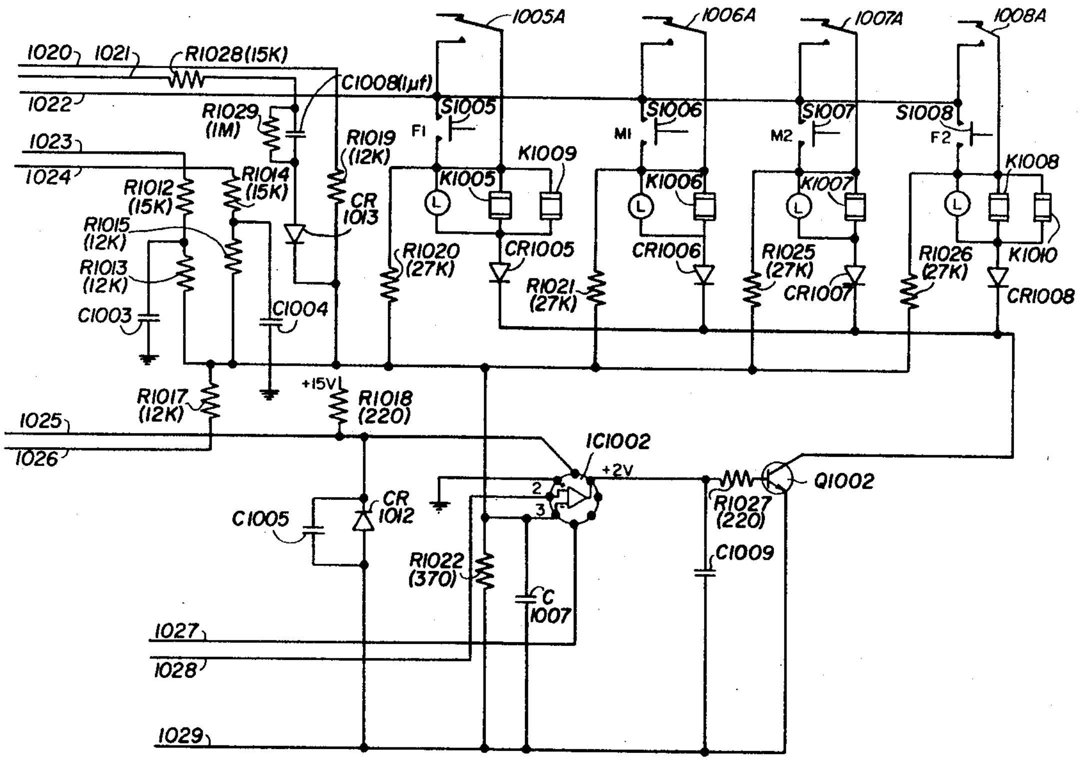
1005A
1006A
1007A
1008A
1020
1021
R1028(15K)
C1008(1μf)
1022
R1029 (1M)
S1005
S1006
S1007
S1008
F1
M1
M2
F2
R1019 (12K)
K1009
K1008
1023
1024
R1012 (15K)
R1014 (15K)
CR 1013
K1005
K1006
K1007
R1015 (12K)
R1013 (12K)
R1020 (27K)
CR1005
CR1006
R1025 (27K)
R1026 (27K)
K1010
CR1007
CR1008
R1021 (27K)
C1003
C1004
+15V
R1017 (12K)
R1018 (220)
1025
1026
IC1002
+2V
Q1002
C1005
CR 1012
R1027 (220)
C1009
R1022 (370)
C 1007
1027
1028
1029

INVENTOR
JERRY HAUSNER
BY
Eisenman and Strack
ATTORNEYS

INVENTOR
JERRY HAUSNER

BY
Eisenman and Strack
ATTORNEYS

INVENTOR
JERRY HAUSNER

BY Eisenman and Strack
ATTORNEYS

INVENTOR
JERRY HAUSNER

BY
Eisenman and Strack
ATTORNEYS

INVENTOR
JERRY HAUSNER

BY
*Eisenman and Strack*
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER
BY
Eisenman and Strack
ATTORNEYS

SELECTION CIRCUITRY

BACKGROUND OF THE INVENTION

1. FIELD OF THE INVENTION

This invention relates to high frequency generators; and more particularly to high frequency generators controllable to sweep within selected bands of a broad total range.

2. DESCRIPTION OF THE PRIOR ART

High frequency signal generators are becoming of increasing importance for both laboratory and commercial application. Such generators operate in the giga-hertz range and preferably provide for controllable sweep throughout some designated band. It has been found that the entire sweep range desired very often requires the utilization of more than one oscillator and associated circuitry. It is also necessary to obtain considerable power output from such generators and, in general, the art has turned to the backward wave oscillator in order to obtain the desired power output. To date, there has been no successful development of solid state circuitry capable of providing the many characteristics required of such units.

Partially as a result of the use of the backward wave oscillator and the attendant circuitry, including the power supplies required in conjunction therewith, broadband high frequency generators have required a great deal of power and have also taken considerable space due to their necessary size and weight.

SUMMARY OF THE INVENTION

The present invention provides a conveniently packaged broadband high frequency generator utilizing solid state circuitry throughout.

It is an object of the present invention to provide an improved broadband high frequency generator.

It is another object of the present invention to provide a high frequency generator capable of sweeping from 1.0 to 12.4 GHz, or any part thereof, either up or down in frequency.

It is another object of the invention to provide a broadband high frequency generator wherein all settings are continuously and independently adjustable over the entire frequency range.

It is another object of the invention to provide a solid state broadband high frequency generator.

It is another object of the present invention to provide a broadband high frequency generator capable of effecting a symmetrical sweep centered on any of several selected center frequencies.

It is another object of the present invention to provide a broadband high frequency generator having marker means for marking frequencies which are independently adjustable over the entire frequency range.

It is another object of the present invention to provide a pushbutton control unit wherein one may select frequencies to be swept by the actuation of selected pushbuttons.

It is another object of the present invention to provide a digital display and selection control of the frequencies available in connection with either continuous wave outputs or band sweeping outputs.

The features of the present invention include the utilization of a single oscillator sweeping a relatively narrow band of frequencies in combination with a frequency multiplier which utilizes the harmonics of the initial frequencies to develop a broader band.

Another feature of the present invention relates to means for utilizing such a single oscillator and frequency multiplier combination which provides a smooth transition between sweep regions as the oscillator returns to its starting point.

Still another feature of the invention relates to the provision of means for matching the frequency multiplier to the oscillator during the sweep.

By the utilization of a digital data presentation, one is able to avoid the compressed scale phenomena necessarily encountered when one utilizes, or attempts to utilize, a linear scale presentation of the frequencies developed over a broad band.

Still another feature of the invention relates to means for digitally presenting frequency data in order to afford maximum resolution of this data and complete control thereover.

Another feature of the invention relates to the utilization of a pushbutton control for function and frequency selection which insures the exclusive and accurate selection of particular generator functioning modes and also insures in connection with this function selection the proper frequency selection from a plurality of control options.

In accordance with the invention, there is provided a high frequency sweep generator using oscillating means to sweep an initial frequency band and multiplier means operative to select harmonics of the frequencies in the initial band for sweeping a higher frequency band or bands. A particularly important feature of the invention concerns the ability to select one of four operating modes and also the ability to select the frequencies to be used in connection with these operating modes. For example, one may select a center frequency and an operating mode wherein a band of prescribed width is swept about this center frequency. One may also select a continuous wave operating mode at a predetermined frequency; use of an external frequency control uninhibited by the internal frequency selection; or the extreme frequencies between which the unit should operate. The present invention makes possible pushbutton selection of both operating mode and the frequency controls to be employed.

In accordance with the invention, there is provided a selection circuit wherein a preselected number of relays are to be selected and energized from a plurality of relays, comprising comparator means operative to produce a discrete output when the input thereto exceeds a predetermined value, individual switch means connected to a voltage source for selecting each of a plurality of relays, impedance means individual to each of a plurality of relays and connected by switch means from the voltage source to the input of the comparator means, the magnitude of the impedance means being selected to permit selection of a preselected number of relays without exceeding the preselected value on the input to the comparator means; further switch means closed in the absence of a discrete output from the comparator means, further switch means being serially connected with each of a plurality of relays across the voltage supply through the individual switch means, and holding means for each of a plurality of relays operative when the relay is energized to bridge the individual switch means.

The above, as well as additional objects and features of the invention, will be more clearly understood and appreciated from the following discussion which is made in conjunction with the attached drawings.

DESCRIPTION OF THE PREFERRED EMBODIMENT

General Description

Figure 1:
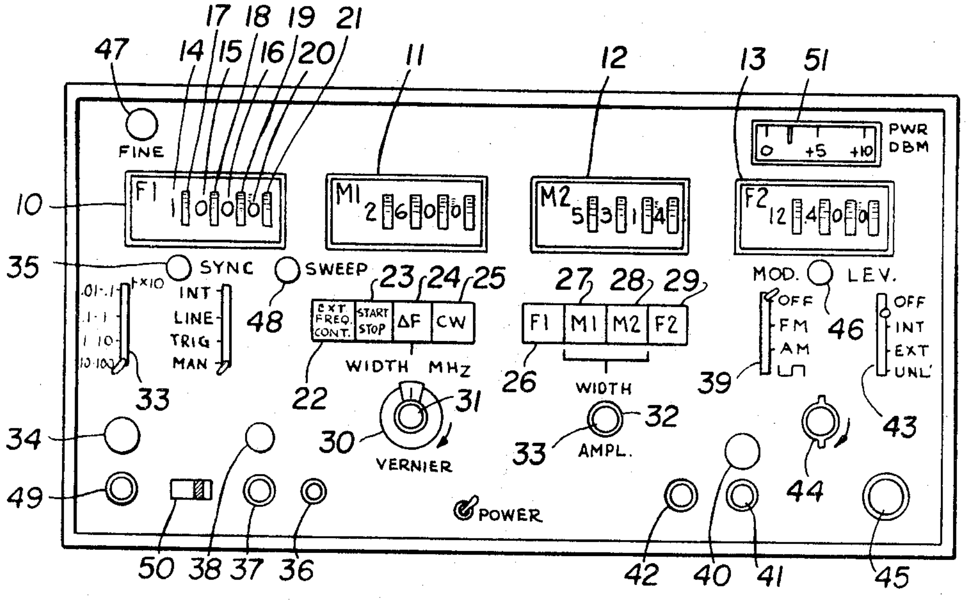
FIG. 1 is an illustration of the control panel of a broadband high frequency sweep generator embodying the features of the present invention.

Before proceeding with a consideration of circuit schematics which illustrate specific circuitry for effecting the more salient features of the present invention, a consideration of the front panel on a unit embodying the invention will be of value. Such a front panel is illustrated in FIG. 1. While reviewing the components appearing on this panel, it will be possible to describe the functions controlled thereby.

Four digital display windows, 10, 11, 12, 13, are horizontally disposed across the upper portion of the unit shown in FIG. 1. Each display window contains four indicator cylinders having decimal digits on the circumference. The cylinders, e.g., 14, 15, 16, representing the three most significant digits, are controlled by indexed thumb wheels, e.g., 17, 18, 19. On cylinder 14, any one of twelve digits may be selected, and on cylinders 15 and 16, any one of ten digits may be selected. The cylinder, e.g., 20, representing the least significant digit appears on the right of each display and is a fine adjustment that is controlled by a thumb wheel, e.g., 21, in analog fashion to yield high resolution. As will be appreciated more clearly hereinafter, each thumb wheel controls a voltage divider network which establishes a direct current voltage level commensurate in magnitude with the digit selected. The number appearing in the windows represents a frequency setting, and the thumb wheels are the manual means for setting the desired critical frequencies.

The window 10 on the left contains the F1 Digital Frequency Selector which is a digital counter that sets and displays the start frequency when operating in the START/STOP mode, the center frequency when operating in the ΔF mode, or the operating frequency when operating in the CW (continuous wave) mode.

The second window 11 from the left contains the M1 Digital Frequency Selector which is a digital counter that sets and displays one of the marker frequencies, or either the start or stop frequency when operating in the START/STOP mode; the center frequency, or one of the marker frequencies, when operating in the ΔF mode; or the operating frequency when operating in the CW mode.

The third window 12 from the left contains the M2 Digital Frequency Selector and functions in the same manner as the M1 Digital Frequency Selector for a second marker. The fourth window 13 on the right contains the F2 Digital Frequency Selector which functions in the same manner as the F1 Selector with the exception that it displays the stop frequency when the equipment is operating in the START/STOP mode.

The preferred embodiment illustrated herein is capable of operation in any one of four discrete modes. The operating mode is selected by depressing one of the four Function Selection Pushbuttons 22, 23, 24, or 25, at the center of the panel.

Pushbutton 22, designated EXT FREQ CONT, activates the system to operate in response to an external frequency control. When this mode is selected, the internal frequency selecting elements of the equipment are not used.

When the START/STOP pushbutton 23 is activated, the system operates to produce a sweep frequency output varying between two extremes determined by any two actuated pushbuttons 26–29 in the adjacent Frequency Selection array. The direction of the sweep will be either up or down the frequency spectrum in accordance with whether or not the left-most Frequency Selector is set to a higher or lower value, respectively.

When the ΔF pushbutton 24 is actuated, the system operates to sweep a band about the center frequency determined by the actuated one of the four Frequency Selection pushbuttons 26–29. When in the ΔF operating mode, one may arrange for sweeping about four independent center frequencies and establish the particular frequency used at any one time, by appropriate setting of the Digital Frequency Selectors. The particular frequency to be used is then selected by actuation of the Frequency Selector pushbuttons. The width of the band swept during the ΔF operating mode, is determined by one of the coaxial control elements 30, 31. This is a dual knob control providing an indexed element 30 for selecting, for example, one of four sweep bands between 0.1 and 100 MHz; and a rotatable vernier control 31 which varies the band width within the selected range.

When continuous wave operating mode is initiated by actuation of the CW pushbutton 25, the system operates to provide a continuous frequency output at any one of the frequencies selected by actuation of the Frequency Selector Pushbuttons 26–29.

As noted above, the Frequency Selection Pushbuttons 26–29 are used to choose the Digital Frequency Selector to be employed in a particular operation. It will be noted that each of these pushbuttons bears a designation corresponding to one of the Digital Display controls, F1, M1, M2, or F2. The F1 pushbutton 26 is used to select the start frequency when operating in the START/STOP mode; to select the center frequency in the ΔF mode; or to select the operating frequency in the CW mode. The particular frequency selected is the one designated in the F1 display window 10. The M1 pushbutton 27 selects one of the marker frequencies; either the start or stop frequency in the START/STOP mode; the center frequency in the ΔF mode; or the operating frequency in the CW mode. The particular frequency selected is the one designated in the M1 display window 11. The M2 and F2 pushbuttons 28 and 29, similarly control the selection of the frequencies designated in the M2 and F2 display windows 12 and 13, respectively.

The width and amplitude of the marker pulses are controlled by the dual knob coaxial control 32,33.

With a general understanding of the controls which may be effected with equipment embodying the features of this invention, it will now be possible to discuss in detail the various circuits used to effect these controls.

Figure 2:
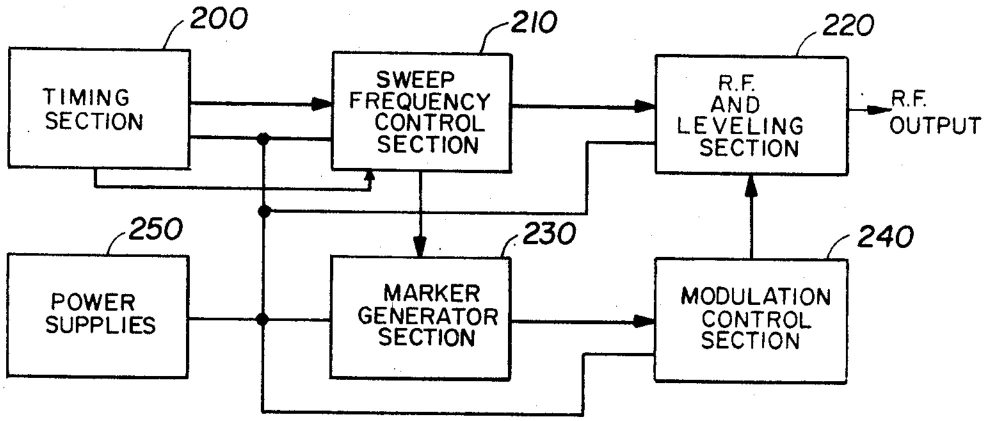
FIG. 2 is a general block diagram of the basic sections of a frequency sweep generator embodying the features of the present invention.

The equipment may be considered to comprise six distinct sections: a Timing Section 200, a Sweep Frequency Control Section 210, a Modulation Control Section 240, a Radio Frequency and Levelling Section 220, a Marker Generator Section 230, and a Power Supply Section 250. The relationship between each of these basic sections is shown in FIG. 2.

Timing Section 200 contains the basic rate or frequency generator which controls the start of a ramp signal. It also contains high and low limit detectors, the first of which senses the end of a retrace cycle to insure that a new sweep cannot be initiated until the preceding sweep has completed its retrace cycle. The low limit detector senses the end of a new sweep and initiates the retrace cycle of a Miller Integrator to start it back to its positive saturation voltage. This will be discussed in more detail hereinafter.

Sweep Frequency Control Section 210 generates a ramp voltage between levels determined by the START/STOP frequency settings on the F1 and F2 Digital Frequency Selectors. Thus, for example, if F1 is set to 1.000 GHz and F2 is set to 12.400 GHz, the ramp generated would be 1.000 to 12.400 volts. When the sweep time lever 33 is set in the 0.01–0.1 second position, as explained hereinafter, an over-ride relay is provided to slow the sweep time by a factor of 10, if the sweep width exceeds the limitations of the sweep time.

When operating in the CW mode, the ramp voltage is replaced by a direct current voltage equal to the setting of the Digital Frequency Selector being used. When operating in the ΔF mode, a small ramp is superimposed on the CW direct current voltage. The superimposed ramp is then adjustable by means of control 30, 31.

Marker Generator Section 230 samples the ramp voltage and generates marker pulses at the frequency selected on the Digital Frequency Selectors M1 and M2. As previously noted, provision is made for controlling the width and amplitude of the marker pulses.

Modulation Control Section 240 includes a summing amplifier which sums the external or internal modulation and the frequency markers and provides the result to the Radio Frequency and Levelling Section 220.

The Radio Frequency and Levelling Section 220 is operative to sample the ramp voltage and drive a basic yig-tuned radio frequency oscillator. The output of the oscillator is then supplied to a diode switch which provides the control for radio frequency modulation, radio frequency amplitude control, and levelling capability. In accordance with the operation selected, a directional detector or an external detector will feed a leveller amplifier which activates a diode switch driver to drive the diode switch. Switchpoint blanking is generated at the switchover point from one harmonic of the radio frequency oscillator frequency to another, and this is generated in coincidence with the switchover time dwell.

Power Supply Section 250 operates to provide all necessary supply and biasing voltages. These voltages are subjected to the filtering required. Because the present invention uses all solid state components, the amount of power required is considerably less than that used by prior art equipment having comparable output capacity.

Figure 3:
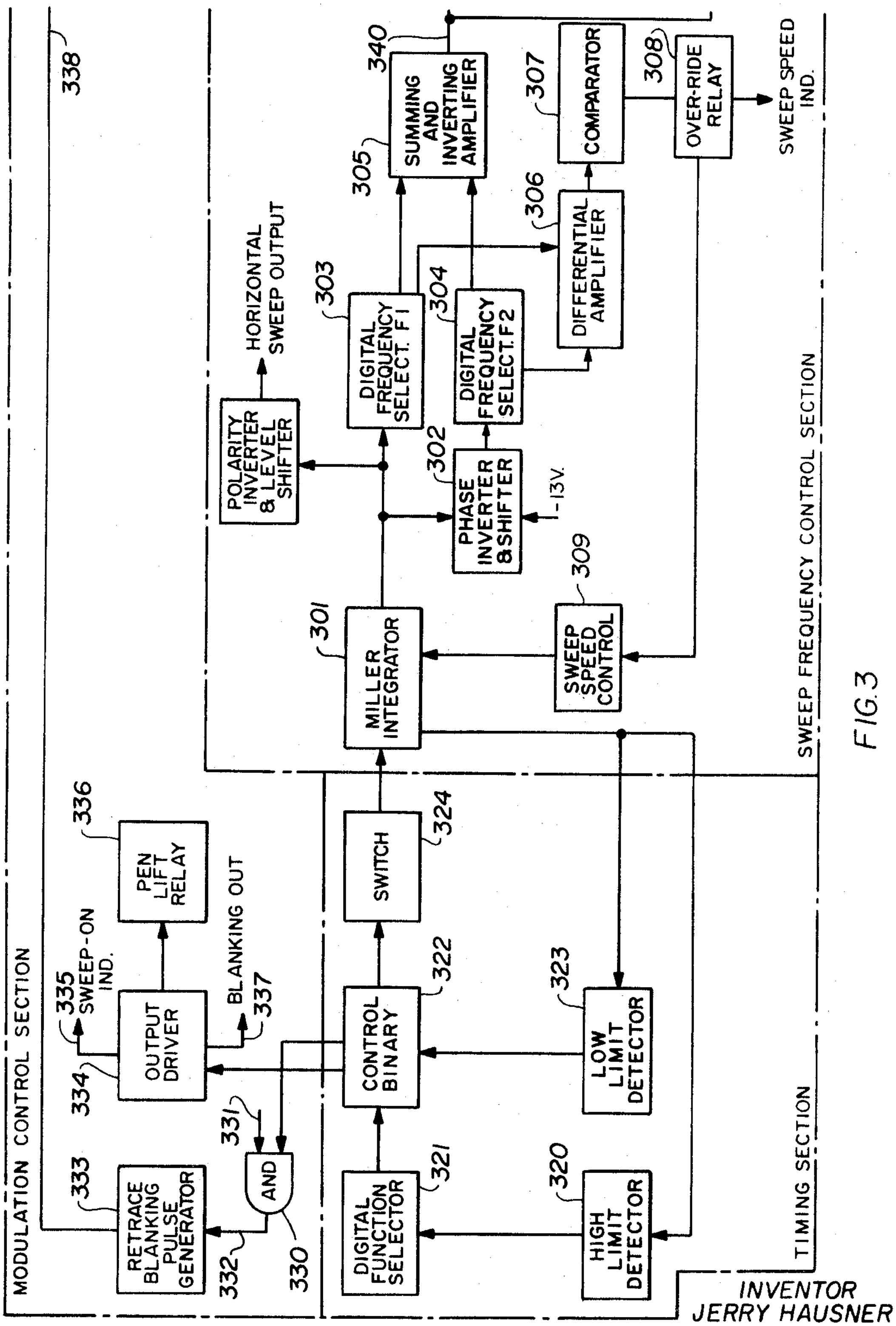
FIGS. 3 and 4, when placed side-by-side, constitute a more detailed block diagram of the major components of a frequency sweep generator embodying the features of the present invention.
Figure 4:
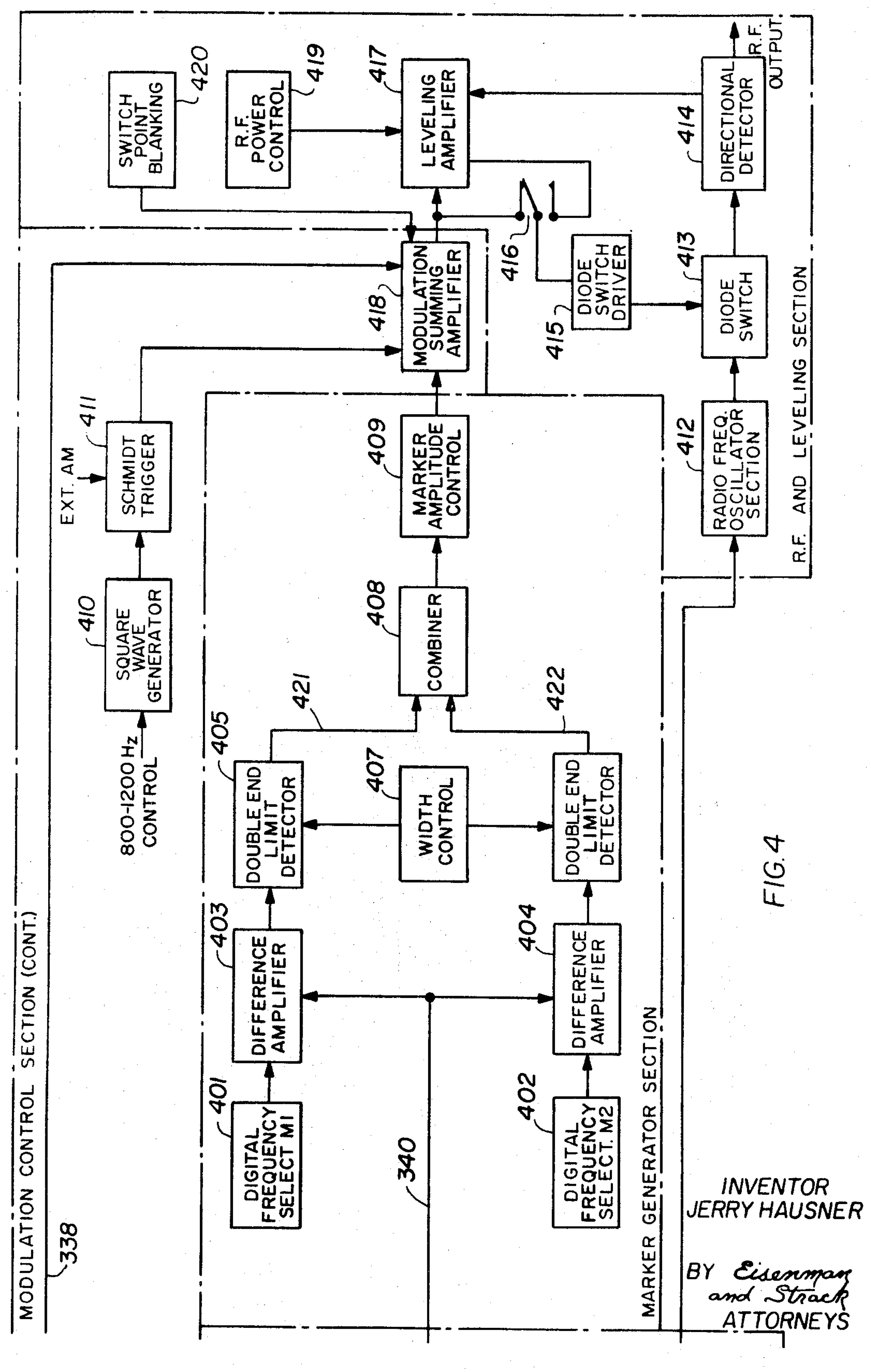
Figure 5:
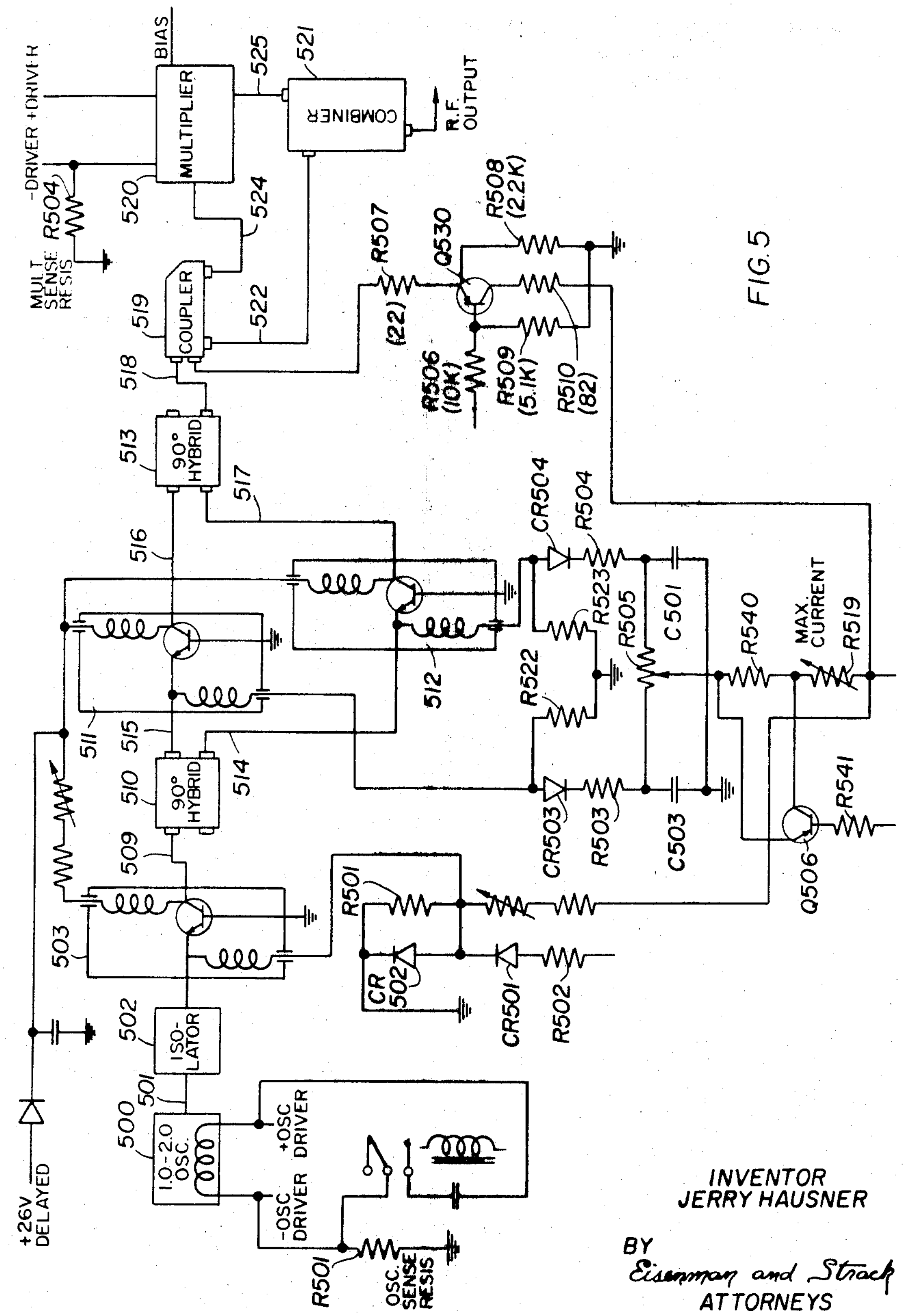
FIG. 5 is a combined block and circuit schematic diagram of the radio frequency section of a frequency sweep generator embodying the features of the present invention.
Figure 6:
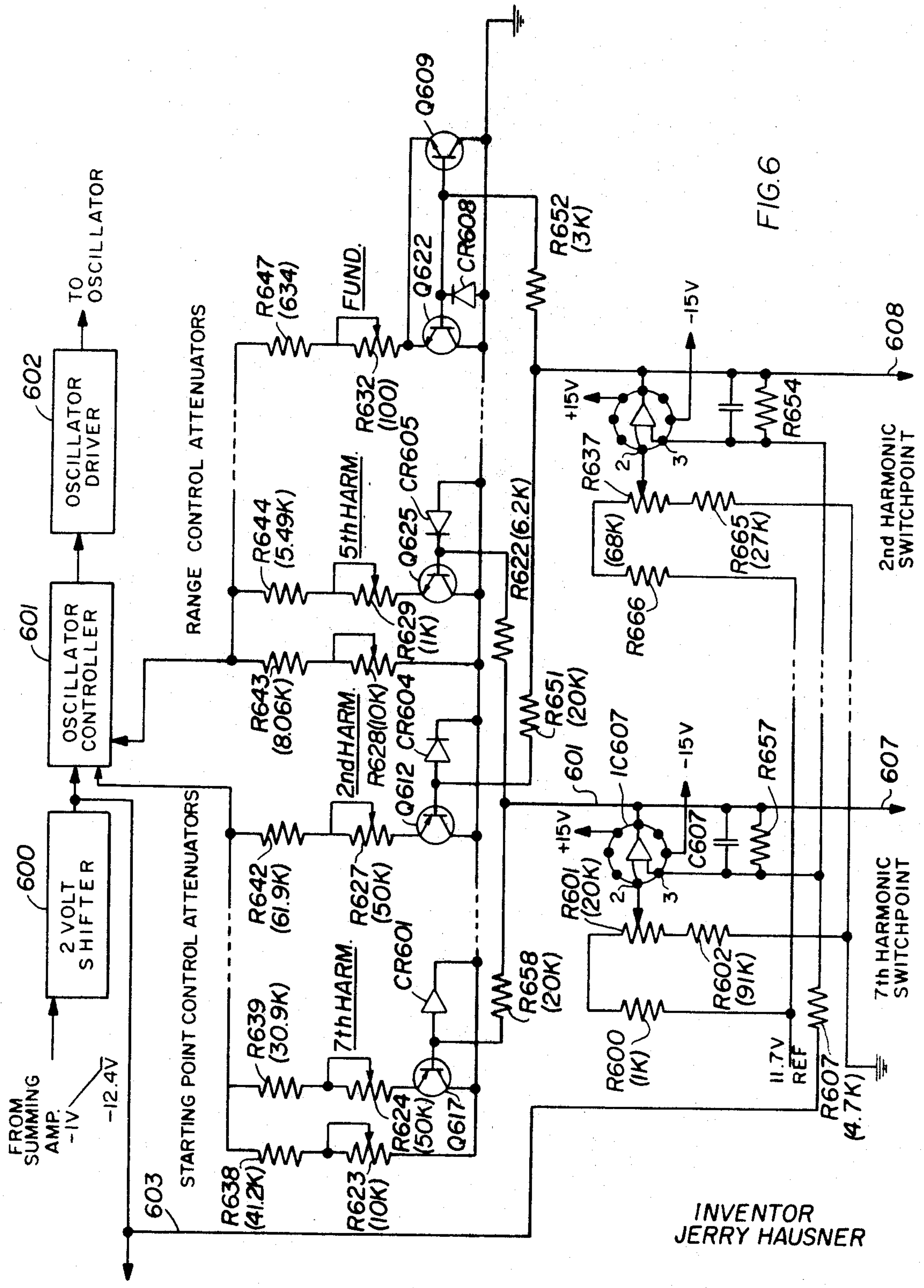
FIG. 6 is a combined block and circuit schematic diagram illustrating oscillation control circuitry in a frequency sweep generator embodying the features of the present invention.
Figure 7:
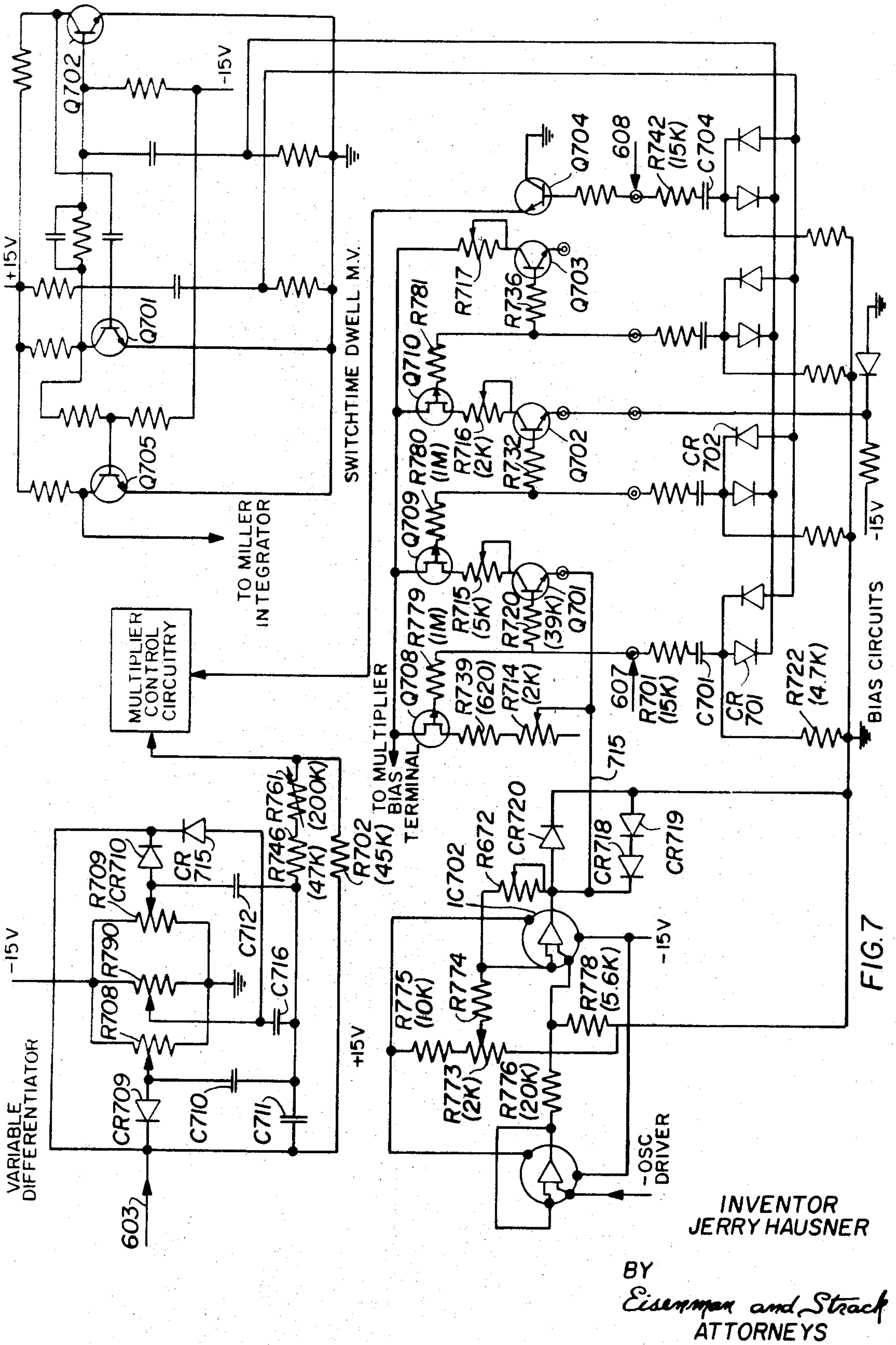
FIG. 7 is a combined block and circuit schematic diagram illustrating a multiplier control section in a frequency sweep generator embodying the features of the present invention.

A more complete consideration of the contents of the various sections may be had by consideration of the more detailed block schematic presented in FIGS. 3 and 4. These figures should be positioned adjacent to one another with FIG. 3 on the left. In this block schematic, the sections referred to in connection with FIG. 2 are delineated by means of dash-dot lines.

The Sweep Frequency Control Section is disposed across the right hand portion of FIG. 3. It will be seen to include a Miller Integrator 301 which generates the basic ramp signal for sweep control. In the particular embodiment shown, the ramp descends from +13 to zero volts. This ramp is applied to a Phase Inverter and Shifter 302 which changes it to one varying from zero to +13 volts. The positive ramp is then applied to a voltage divider associated with the F2 Digital Frequency Selector, designated by block 304. The output of Miller Integrator 301 is also applied directly to the voltage divider associated with the F1 Digital Frequency Selector, designated by block 303. The outputs of the F1 and F2 Frequency Selectors are both supplied to a Summing and Inverting Amplifier 305 and to a Difference Amplifier 306. Summing and Inverting Amplifier 305 may also receive an external frequency on lead 310.

The output of Summing and Inverting Amplifier 305 is a ramp voltage which is commensurate with the start/stop frequency settings on the F1 and F2 Digital Frequency Selectors. Thus, for example, if F1 is set to 1.000 GHz and F2 is set to 12.400 GHz, the ramp generated would be −1.000 to −12.400 volts. On the other hand, if F1 is set to 3.000 GHz and F2 is set to 6.700 GHz, the ramp generated would be −3.000 to −6.700 volts. Difference Amplifier 306 samples the output ramp produced by both the F1 and F2 Digital Frequency Selectors and compares the difference with a reference sweep width via a Comparator 307. In the event that the sweep width exceeds the limitations of the sweep time established by the controls, an Override Relay 308 is actuated to introduce Sweep Speed Control 309 and thereby increase the sweep time by a factor of ten. As described in full hereinafter, Override Relay 308 functions only when Sweep Time lever 33 selects the 0.01 to 0.1 second sweep time range.

The Timing Section occupies the lower left quadrant of FIG. 3. In this Section, the Sync and Sweep Mode control are combined with the output of a High Limit Detector 320 that is operative to detect the end of a retrace. This combining takes place in a logic NAND gate forming part of Digital Function Selector 321 and it insures that a new sweep is not initiated until the preceding sweep has completed its retrace cycle. The output of the NAND gate is applied to a Control Binary flip-flop circuit 322 which supplies an output to a logic AND gate 330 in the Modulation Control Section. The flip-flop in Control Binary 322 is also driven by a Low Limit Detector 323 which detects the end of a sweep. The Low Limit Detector 323 causes Control Binary 322 to close a switch at the Miller Integrator ramp generator in order to start the ramp generator retrace cycle back to a positive saturation voltage.

The Marker Generator Section is illustrated on the left side of FIG. 4. The M1 and M2 Digital Frequency Selectors produce voltages developed by voltage dividers which are commensurate with the desired frequencies. A Difference Amplifier 403 samples the ramp voltage supplied on lead 340 from the Summing and Inverting Amplifier 305 and subtracts it from the reference voltage generated by the M1 Digital Frequency Selector 401. The resultant shifted saw-tooth signal is then fed to a Double End Limit Detector 405 which acts as a comparator that is centered at zero volts, and produces an M1 marker pulse on lead 421. Pulse Width Controller 407 is the adjustable width control potentiometer 32 which sets the voltage between the Detector end limits. The M1 marker pulse is then fed through a Combiner 408 and Amplitude Controller 409 to the Modulation Summing Amplifier 418. Amplitude Controller 409 is adjusted by front panel amplitude potentiometer 33 which establishes the pulse amplitude.

The output from the M2 Digital Frequency Selector 402 is also compared in a second Difference Amplifier 404 with the ramp signal on lead 340 in order to generate a shifted saw-tooth signal which is then applied to a second Double End Limit Detector 406. As described with respect to the voltage from the M1 Digital Frequency Selector, Limit Detector 406 generates an appropriately positioned M2 marker pulse on lead 422, having its width controlled by Width Controller 407. This second marker pulse is then combined with the first pulse in Combiner 408 and it is amplitude modified prior to application to Summing Amplifier 418.

When there is to be pulse modulation, either internally or externally initiated, the markers are combined in Modulation Summing Amplifier 418 with the modulating signal. When internal square waves modulation is employed, a Square Wave Generator 410 produces a square wave output having a frequency determined by the setting of the control potentiometer 40. This output supplies Modulation Summing Amplifier 418 via a Schmidt Trigger Circuit 411. When external amplitude modulation is to be utilized, it is introduced directly to Schmidt Trigger Circuit 411.

Retrace blanking is effected by means of the previously mentioned AND gate 330 which receives inputs from Control Binary 322. The output of the AND gate 330 is amplified and balanced to zero volts and then applied on lead 338 to Modulation Summing Amplifier 418 via a Retrace Blanking Pulse Generator 303. The AND gate 330 inputs are from the EXT FREQ CONT and CW pushbuttons 22 and 25. The MAN SCAN position of lever 35 removes the blanking voltages. An additional output from the Control Binary 322 goes to an Output Driver 334 which is utilized to control the sweep-on indicator lamp 48, provide a blanking output on lead 337, and for pen lift relay operation at block 336.

The Radio Frequency and Levelling Section shown on the right side of FIG. 4, includes the RF Oscillator Section 412 which feeds its output to Diode Switch 413. Diode Switch 413 feeds a Leveler Amplifier 417 via an optional Directional Detector 414 during levelled operation, and provides the control for RF modulation, RF amplitude control, and the levelling capability. As illustrated, the output of Diode Switch 413 may be fed directly through the Directiona; Detector 414 to an RF output connector. Diode Switch 413 is controlled by a Driver 415 associated with a relay 412 which allows the signal from the Modulation Summing Amplifier 418 to by-pass levelling amplifier 417, when desired, to provide faster rise time during operation in an unlevelled mode.

At the switchover point from one harmonic of the RF oscillator frequency to another, blanking is generated in the RF section by means of the Switchpoint Blanking unit 420. A 12 millisecond pulse blanks the RF frequency while RF oscillator 412 is returning to its lowest fundamental frequency. This blanking pulse is generated in coincidence with the switchover dwell time.

Detailed Description

With a general understanding of the various circuits and their interconnections, it is now possible to consider the more detailed circuit schematics of pertinent features. It will be appreciated that these schematics are presented for illustrative purposes only. There is no intention, unless specifically limited by the claims, of restricting the invention to the particular circuit connections or components shown. Still further, there is no intention to illustrate in the circuit schematics, every possible component or portion of the embodiments discussed hereinbefore. The circuit diagrams are presented for the purpose of showing in detail a preferred embodiment of the various pertinent features of this invention. Modifications will be immediately apparent to those skilled in the art and where not specifically germane to the invention, these modifications would be considered to be embraced by the present disclosure.

In order to make it easier to follow the discussion of the various FIGURES presented herewith, several conventions have been adopted. In general, the elements have been illustrated in accordance with standard industry practices. When believed helpful, actual values have been shown for voltages and impedances. In addition, the elements have been given alphanumeric designations wherein the alphabetic portion suggests the type of element and the numeric portion indicates the particular element involved. For example, the letters R, C, Q, and IC denote resistors, capacitors, transistors, and integrated circuits, respectively. Where possible, the numbers used employ the FIGURE number as the hundreds digit. For example, element R510 is a resistor appearing in FIG. 5. The circuitry in FIGS. 5 through 8 is not specifically germane to the present invention; a detailed discussion of this circuitry is available in co-pending application, Ser. No. 103,779, filed Jan. 4, 1971.

Frequency Selection Circuits

Figure 9:
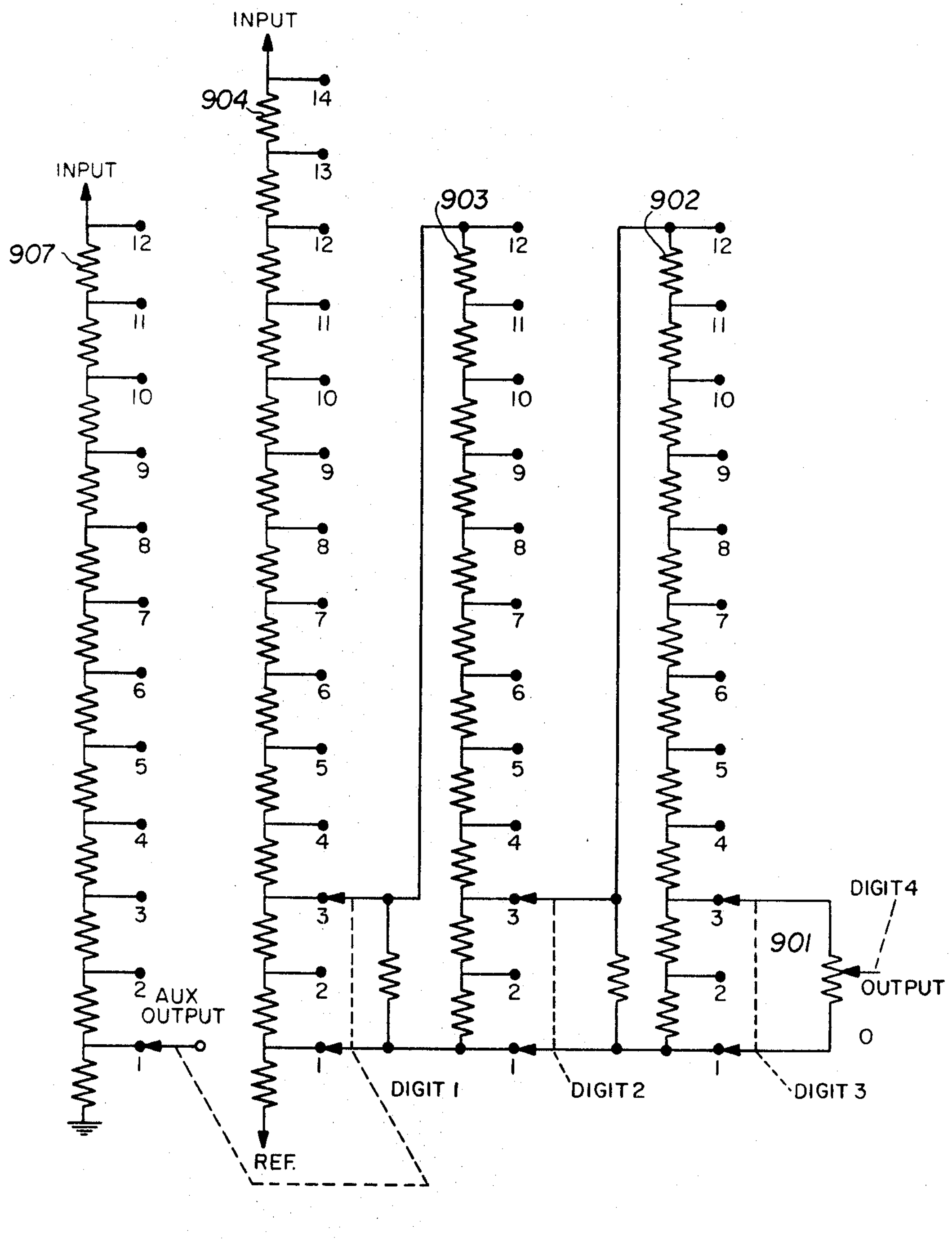
FIG. 9 is a circuit schematic of the digital display counter associated with a frequency selector used in conjunction with the present invention.

The Frequency Selection Indicators 10–13 appearing in FIG. 1, display and control the setting of voltage divider switches. One array of such switches, controlled by the digit wheels 17, 18, 19, 21 of the F1 Digital Frequency Selector 10, for example, is shown in FIG. 9. The three voltage dividers, 904, 903, 902, at the right establish the reference voltages for the three most significant digits of the selected frequency. The adjustable resistance 901, having slide tap 906, establishes the reference voltage for the least significant digit of the selected frequency. It will be noted that the illustrated circuit is a standard Kevin-Varley voltage divider arrangement with a vernier control for the fine voltage selection. The unit, as illustrated, registers a frequency selection of 1.000 GHz. As the slide contacts are moved upward on each divider, the various digits increase in ascending order as shown.

Figure 11:
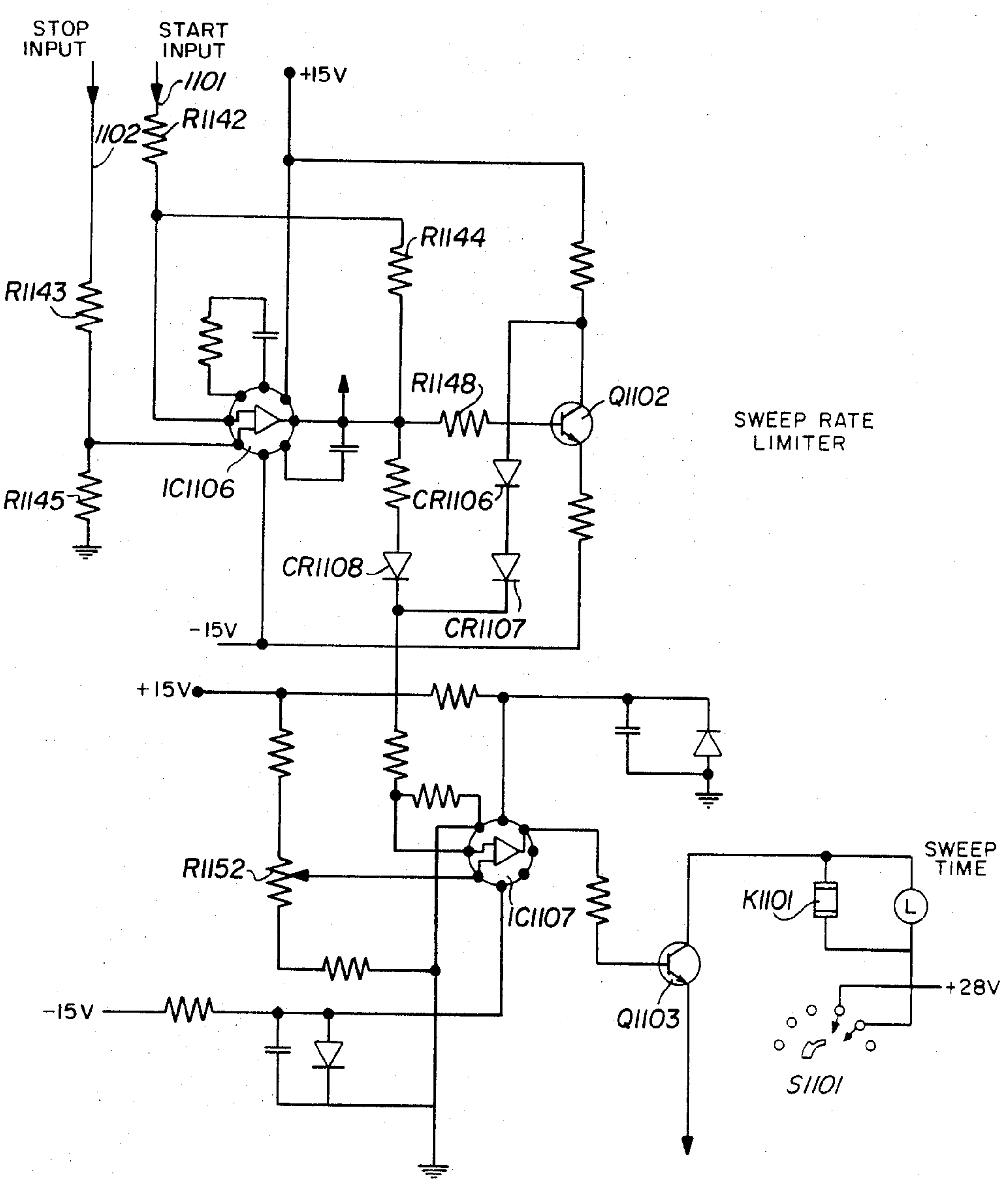
FIG. 11 is a circuit diagram of a sweep rate limiting circuit employed in a frequency sweep generator embodying the features of the present invention.

A fourth voltage divider 907 designated AUX OUTPUT is disposed across the left hand portion of FIG. 9. The function of this voltage divider is to insure that the sweep speed selected by the operator of the equipment is not in excess of the tracking capabilities of the Frequency Multiplier. This potential problem has been discussed hereinabove, and may occur when a fast sweep speed is selected and too broad a frequency range is to be swept. When operating in the START/STOP mode, the circuitry shown in FIG. 11 is employed to solve the problem.

Selection of the START/STOP mode is effective, as explained hereinafter, to produce a "start input" voltage on lead 1101 and a "stop input" voltage on lead 1102. These voltages correspond to the voltages for the most significant digit of the selected start and stop frequencies, as determined by the ganged setting of the Auxiliary Voltage Divider 907. For example, if one Frequency Selector is set at 2.000 GHz, the input therefrom would be equivalent to 2.000 volts. If it is set at 2.600 GHz, the input therefrom would still be equal to 2.000 volts. It will only change to 3.000 volts when the first digit is changed to a 3. The two inputs are applied to terminals 2 and 3 of a differential amplifier IC1106, which subtracts the voltage from the two inputs and produces an output equal to the difference. If the start frequency, for example, is 2.000 GHz and the stop frequency is 6.000 GHz, the output voltage of amplifier IC206 will be 4.000 volts. This voltage may be positive or negative, depending upon the direction of sweep. If the sweep is increasing in frequency, the voltage will be positive and if it is decreasing in frequency, the voltage will be negative.

When the sweep is in the direction of increasing frequency, the positive voltage difference appearing at IC1106 output terminal 6 is effective to forward bias diode CR1108. When the output voltage at terminal 6 is negative, CR1108 will be back-biased, and the voltage is applied to the base of transistor Q1102. As shown, this transistor is biased with its collector at +15 volts and its emitter at −15 volts. Accordingly, the negative bias applied by the output of amplifier IC1106 tends to cut-off the transistor and drive the collector thereof positive. This in turn forward-biases diodes CR1106 and CR1107. In effect, the configuration of diodes CR1106, CR1107, CR1108, and transistor Q1102 is operative to deliver the output of differential amplifier IC1106 to the succeeding circuitry as a positive signal having a magnitude equal to the difference in the start and stop frequencies. This is applied to Comparator IC1107 which compares the difference voltage with a variable reference voltage obtained from a potentiometer R1152. If the difference voltage is positive with respect to the reference level, the output of Comparator IC1107 is positive. If the difference voltage is negative with respect to the reference level, the output of Comparator IC1107 is negative. Depending upon these output conditions, a relay K1101 will either be energized or not.

When the output of Comparator IC1107 is positive, it applies a positive bias to the base of a transistor Q1103 which is suitably energized to render it conductive in a series circuit including relay K1101, when the Sweep Time Switch S1101 (Element 33 in FIG. 1) is positioned to select a sweep time within the minimum range of 0.01 seconds. When energized, relay K1101 closes contacts **K1101*a* illustrated in FIG. 8. When the output of Comparator C1107 is negative, there is no appreciable effect upon the operation of either transistor Q1103 or the connected relay K1101. Thus, in order to call operation of relay K1101 into play, the selected sweep range must be beyond an amount determined by the setting of reference level potentiometer R1152, and the selected sweep speed must be within the range 0.01 to 0.1 second. When relay K1101 is operated, a lamp 1109 (lamp 33 in FIG. 1**) connected in parallel therewith, will be illuminated.

Figure 8:
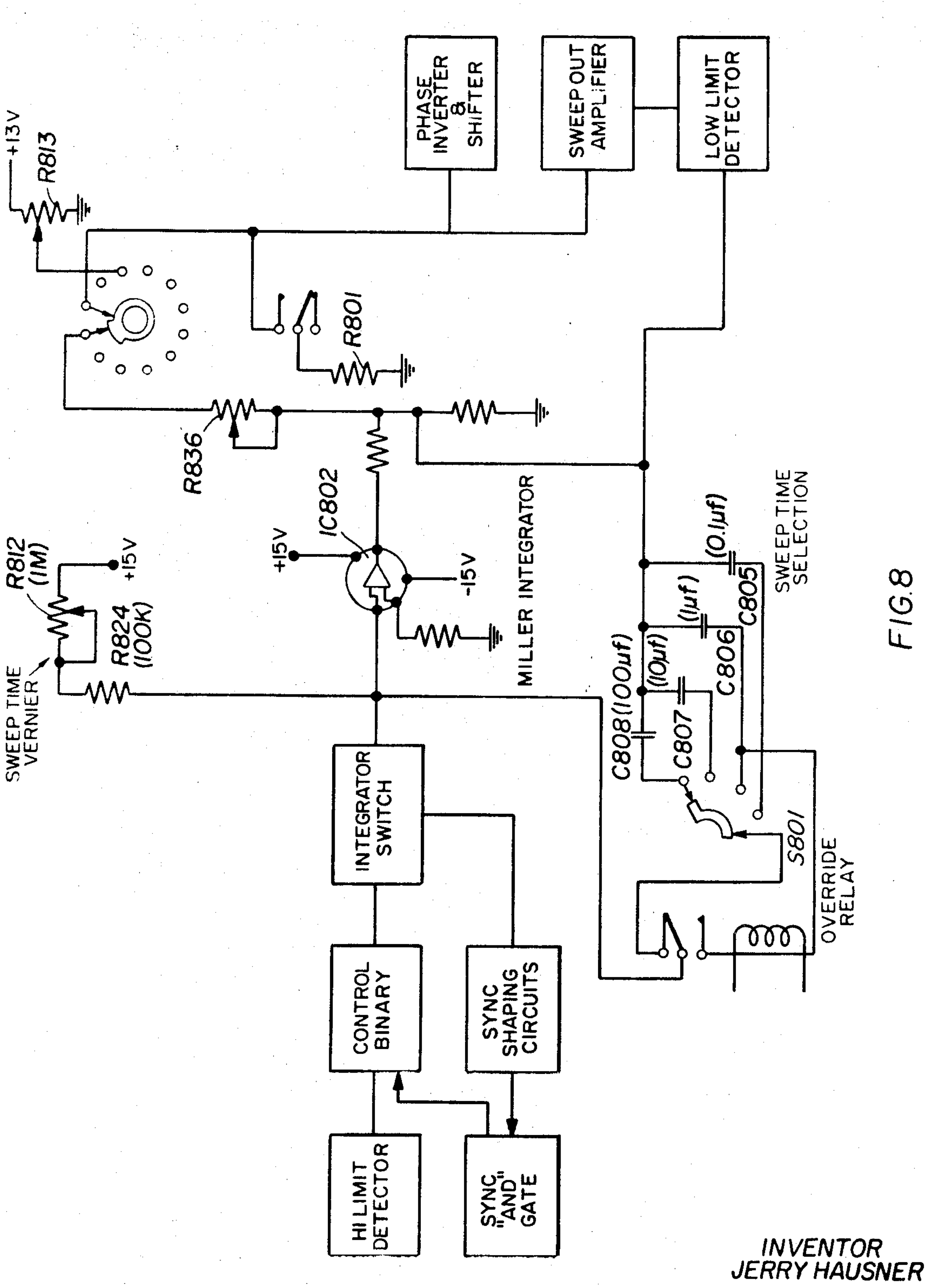
FIG. 8 is a combined block and circuit schematic diagram illustrating the timing section and a portion of the sweep frequency control section of a frequency sweep generator embodying the features of the present invention.

The effect of operating relay K1101 will be apparent from the circuitry of FIG. 8 which controls the charging of the Miller Integrator Sweep Circuit. A second deck of the Sweep Time Switch appears as S801 in FIG. 8. The lower portion of FIG. 8 reveals the manner in which the sweep is changed by switching in Capacitors C805, C806, C807, and C808, as the Sweep Time Selector is moved up in range. These capacitors appear in a timing circuit including a Resistor R824. Under the special condition when relay K1101 is operated, the contacts K1101a thereof move to replace Capacitor C805 with Capacitor C806 which is, in fact, the one normally utilized for the 0.1 to 1.0 second sweep speed range.

Operating Mode Selection Circuits

It will be appreciated that the proper functioning of this sweep frequency generating equipment requires that only one function, or operating mode, be selected at any one time. It will be further appreciated that the selection of a function by means of depressing a pushbutton introduces certain time delay problems. Still further, in order to avoid damage to the equipment, it is necessary to guard against the possibility that someone, either intentionally or inadvertently, tries to select two functions at the same time. The circuitry shown in FIG. 10 has been designed to permit the exclusive selection of a single function; this selection being automatically overridden when one makes a second exclusive selection.

Figure 10A:
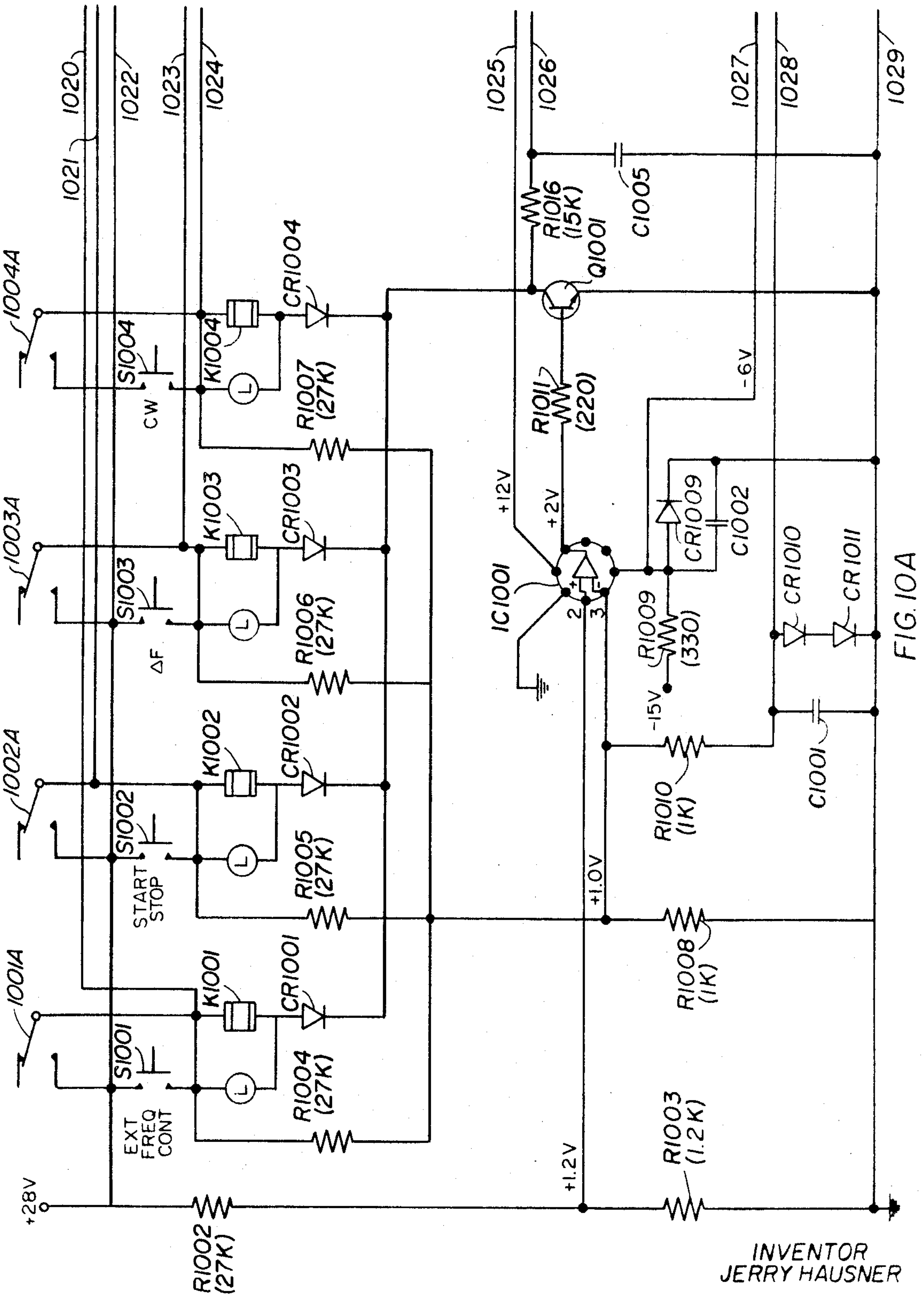
FIG. 10 is a circuit schematic of the function and frequency selection circuitry of a frequency sweep generator embodying the features of the present invention.
Figure 10B:
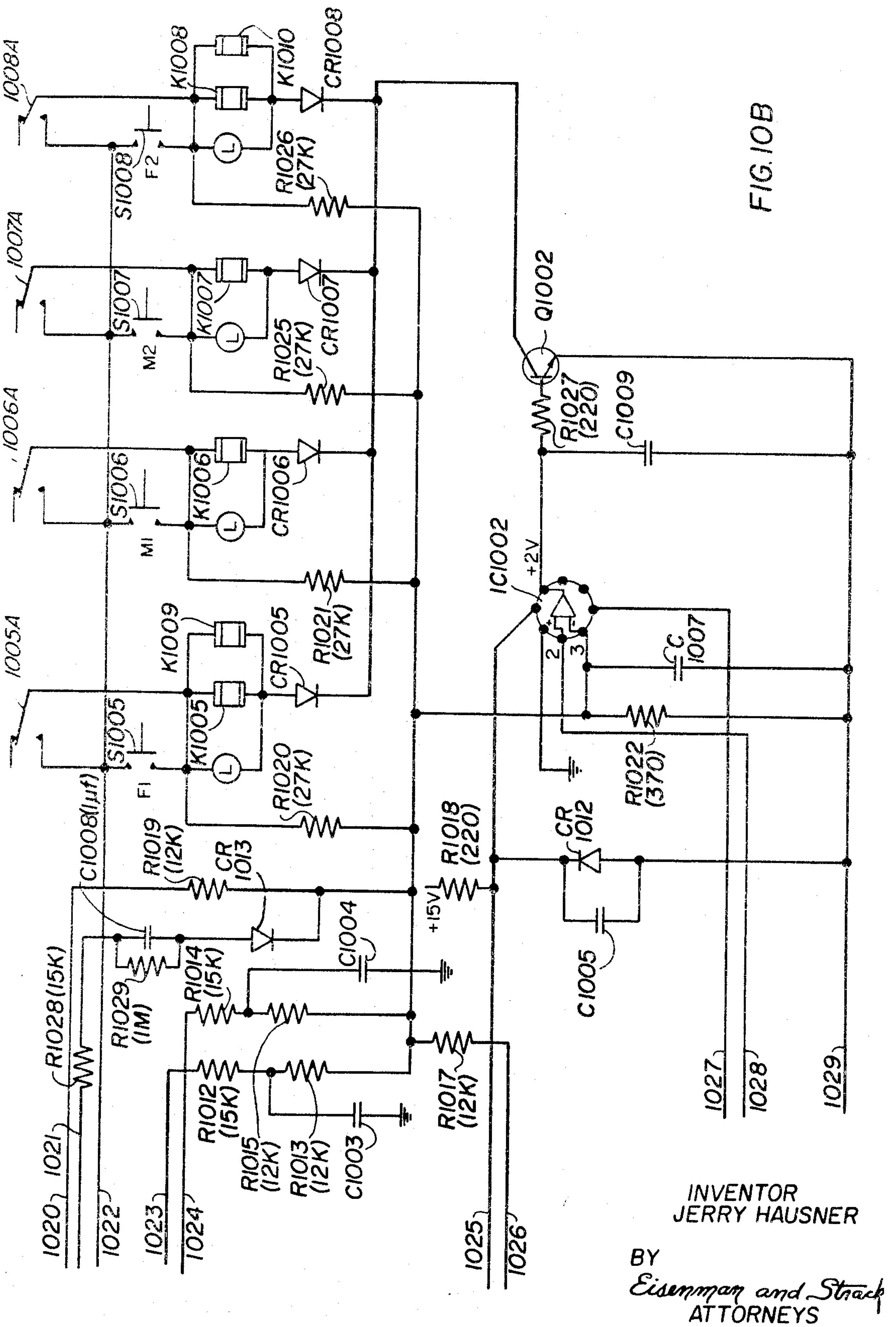

For ease of description, the circuitry shown in FIG. 10 has specific voltage and element values indicated. It will be appreciated that these values are for illustrative use only, in an attempt to facilitate the explanation of the circuit operation. A wide variety of other values and components may be selected in accordance with the designer's particular desires and intentions.

Each of the pushbuttons 22, 23, 24, and 25 shown in FIG. 1, is represented in FIG. 10 by the words appropriate to the function desired. Operation of the pushbutton will result in actuation of the contacts illustrated adjacent thereto.

Consider first the selection of the external frequency controlled operating mode by actuation of the EXT FREQ CONT pushbutton on the extreme left of the figure. Actuation of this pushbutton is operative to apply the +28 volt supply through switch S1001 and a voltage divider consisting of resistor R1004 and resistor R1008, to ground. This voltage divider places a 1 volt input upon terminal 3 of Comparator IC1001, as a result of the voltage division ratio. Comparator IC1001 is designed to provide a positive output when the difference between a reference value on input 2 and the input on terminal 3 is positive, and a negative output when the difference is negative. Terminal 2 is held at 1.2 volts by a voltage divider comprising resistors R1002 and R1003. Thus, operation of the EXT FREQ CONT pushbutton results in a 0.2 volt difference on the inputs and a positive voltage output from Comparator IC1001. The positive output is applied to the base of a transistor Q1001.

Closure of switch S1001 also establishes a path therethrough including relay K1001, diode CR1001, and the collector-emitter path of transistor Q1001. The positive bias on its base and the supply to its collector, causes switching of transistor Q1001 into conduction and provides an energization circuit for relay K1001. Operation of relay K1001 is effective to close the contact **1001*a*** illustrated thereabove to hold the relay energized after release of the pushbutton. In addition, via contacts not shown in this figure, the essential portions of the sweeper circuitry are called into operation.

Consider now the operation of the circuit when a second Function Selector Switch is actuated. For example, consider the operation of the START/STOP function pushbutton which closes switch S1002. The closure of switch SW1002 results in the further introduction of resistor R1005 in parallel with resistor R1004 of the voltage divider across the supply. The voltage applied to terminal 3 of Comparator IC1001 now rises to approximately 2 volts, resulting in a negative output from Comparator IC1001 and a negative biasing of transistor Q1001. The negative bias cuts off transistor Q1001 and removes the energization path from all Function Selecting Relays. Thus, the external frequency control relay K1001 will drop out and if one were able to remove his finger quickly enough from the START/STOP pushbutton, all function select relays would be disabled. In fact, the drop-out is sufficiently quick that external frequency control relay K1001 will be deenergized while relay K1002 will remain energized.

Obviously, any attempt to select two or more of the function selector pushbuttons will result in a negative output from Comparator IC1001 with the necessary result that only the last to be released pushbutton will select the operating mode.

Frequency Selection Circuits

The selection of the various control frequencies is also effected by pushbuttons and associated relays. Different operating criteria are required for these circuits, however, because under certain operating modes, it is necessary to permit selection of only one frequency, whereas under other operating modes, it is necessary to permit selection of only two frequencies. Under no circumstances may more than two frequencies be selected at any one time.

Consider first the operation of the Frequency Selection Circuits when External Frequency Control is the operating mode. Under these conditions, the 28 volt supply is applied via resistors R1019, R1017, and R1016, to the collector of transistor Q1001. It is also applied via resistor R1019 directly to input terminal 3 of a Comparator IC1002. The reference to terminal 2 of the frequency selection comparator IC1002 is the same as input to terminal 3 of the function control comparator IC1001, as applied via a resistor R1010. Assuming that the external frequency control input has been properly selected, the reference value to IC1002 will be 1 volt. The voltage division network established by resistor R1019 and resistor R1022 is such that comparator IC1002 is back-biased and produces a negative output. Under these conditions, its associated transistor Q1002 is disabled and makes it impossible for any of the Frequency Selection switches to be actuated and locked in.

Consider next the situation when the START/STOP operating mode is selected. Under these circumstances, two of the Frequency Selection buttons must be actuated and locked in. If three buttons are operated, an erroneous condition has been created and therefore all of the buttons must be deactivated in order to permit reselection. Under the START/STOP mode, the 28 volt supply is initially presented via a resistor R1028, a capacitor C1008, and a diode CR1013, to terminal 3 of comparator IC1002. Due to the presence of capacitor C1008, the supply is simply presented as a strong positive spike which will back-bias comparator IC1002 and turn-off transistor Q1002, if originally conducting. After this transient situation, capacitor C1008 blocks all further influence of the Function Selection circuitry over the Frequency Selection circuitry. When one now selects a first frequency, e.g., F1, switch S1005 will close and place a slightly positive voltage via resistor R1020 upon input lead 3 of comparator IC1002. This slightly positive voltage will be less than the reference value on terminal 2 and accordingly the comparator will produce a positive output, energizing transistor Q1002 which will conduct in the energization path of relays K1005 and K1009, to hold these relays in an operative state.

The selection of a second frequency pushbutton in the Frequency Selection group, will add a greater positive voltage on terminal 803, but the parallel impedance added is such that this further positive voltage will still leave transistor Q1002 conductive. However, if a third frequency pushbutton is selected, comparator IC1002 will be switched to a negative output. In that event, transistor Q1002 will become nonconductive and all of the energized relays will be released except the one associated with a depressed pushbutton. Thus, the Frequency Selection circuitry is operative to have a pair of frequencies selected only, when START/STOP operation is in effect.

Consider now the operation of the Frequency Selection circuitry when either the $\Delta$F or CW mode of operation is to be used. Under these circumstances, either resistor combination R1012, R1013, or R1014, R1015, respectively, is inserted in series with resistor R1022 across the supply. This establishes the voltages on comparator IC1002 such that selection of a single frequency will make it possible for the comparator to provide the necessary positive output. In the event that a second frequency is selected, comparator IC1002 will experience a negative input and produce a negative output, eliminating any further frequency selection.

The resistor circuitry from both the $\Delta$F and CW Function Selector controls, each include a grounded capacitor C1003 or C1004, respectively. The function of these capacitors is to introduce a time delay which will be operative in the event that one changes from $\Delta$F to CW operation. This time delay makes possible such a change without disabling a frequency selection made prior to the change.

One further aspect is worthy of note in connection with the circuitry of FIG. 10. This concerns the voltage regulation clamping provided by diodes CR1010 and CR1011, which appear in the lower central portion of the figure. These diodes serve a clamping function for the reference voltage that is applied to comparator IC1002 from the input to comparator IC1001. Inasmuch as this reference voltage may exceed 1 volt if an operator attempts to select more than one function at one time, the input to IC1002 is clamped to a value slightly in excess of 1 volt as determined by the forward resistance of the diodes.

A number of specific circuits within a preferred embodiment have been described in detail. In certain instances the values of components in these circuits and the specific voltages supplied have been set forth. It is to be understood that where specific details of voltage and parameter values are used, this has been done in the interest of clarity and modifications in these values within the limits of the operation described, is to be expected from those skilled in the art. All such modifications as may be embraced by the scope of the following claims, is intended to be part of this invention.

The particular aspects of this disclosure which are believed to contain patentable merit, are set forth with specificity in the attached claims.

What is claimed is:

1. A selection circuitry wherein a preselected number of relays are to be selected and energized from a plurality of relays, comprising comparator means operative to produce a discrete output when the input thereto exceeds a predetermined value, individual switch means connected to a voltage source for selecting each of said plurality of relays, impedance means individual to each of said plurality of relays and connected by said switch means from said voltage source to the input of said comparator means, the magnitude of said impedance means being selected to permit selection of said preselected number of relays without exceeding said preselected value on the input to said comparator means, further switch means closed in the absence of said discrete output from the comparator means, said further switch means being serially connected with each of said plurality of relays across said voltage supply through said individual switch means, and holding means for each of said plurality of relays operative when the relay is energized to bridge said individual switch means, comprising a second comparator means operative to produce a discrete output when the input thereto exceeds the input to said first comparator means, a second plurality of relays, second individual switch means connected to said voltage source for selecting each of said second plurality of relays, second impedance means individual to each of said second plurality of relays and connectable by said second switch means from said voltage source to the input of said second comparator means, the magnitude of said second impedances being selected to permit selection of two of said second plurality of relays without exceeding the input to said first comparator means; still further switch means closed in the absence of a discrete output from said second comparator means, said still further switch means being serially connected with each of said second plurality of relays across said voltage supply, through said second individual switch means, and holding means for each of said second plurality of relays operative when a relay is energized to bridge the associated second individual switch means.

2. A selection circuit as defined in claim 1, including means for adding a voltage to the input of said second comparator means when a preselected one of the relays of said first plurality of relays is selected, whereby only one of said second plurality of relays may be selected and remain energized.

3. A selection circuit as defined in claim 2, including means for adding a voltage to the input of said second comparator means when another preselected one of the relays of said first plurality of relays is selected, said voltage exceeding the input to said first comparator means, whereby none of said second plurality of relays may be selected and remain energized.

* * * * *